United States Patent
Baba

(10) Patent No.: US 9,893,531 B2
(45) Date of Patent: Feb. 13, 2018

(54) POWER SUPPLY APPARATUS, POWER SUPPLY SYSTEM, AND METHOD FOR CONTROLLING POWER SUPPLY SYSTEM

(71) Applicant: KYOCERA CORPORATION, Kyoto (JP)

(72) Inventor: Masahiro Baba, Kanagawa (JP)

(73) Assignee: KYOCERA CORPORATION, Kyoto (JP)

( * ) Notice: Subject to any disclaimer, the term of this patent is extended or adjusted under 35 U.S.C. 154(b) by 945 days.

(21) Appl. No.: 14/358,454

(22) PCT Filed: Nov. 5, 2012

(86) PCT No.: PCT/JP2012/007062
§ 371 (c)(1),
(2) Date: May 15, 2014

(87) PCT Pub. No.: WO2013/073126
PCT Pub. Date: May 23, 2013

(65) Prior Publication Data
US 2014/0327315 A1    Nov. 6, 2014

(30) Foreign Application Priority Data

Nov. 15, 2011  (JP) ................. 2011-249374

(51) Int. Cl.
*H02J 3/46* (2006.01)
*H02J 3/38* (2006.01)
(Continued)

(52) U.S. Cl.
CPC .................... *H02J 3/46* (2013.01);
*H02J 3/38* (2013.01); *H02J 3/382* (2013.01);
*H02J 3/387* (2013.01);
(Continued)

(58) Field of Classification Search
USPC ........................................... 307/81
See application file for complete search history.

(56) References Cited

U.S. PATENT DOCUMENTS

| 7,768,244 B2 | 8/2010 | Perol |
| 2008/0247201 A1* | 10/2008 | Perol ............... B64G 1/443 363/73 |
| 2010/0191996 A1* | 7/2010 | Iino ................... H02J 3/14 713/323 |

FOREIGN PATENT DOCUMENTS

| EP | 2214283 A2 | 8/2010 |
| FR | 2910141 A1 | 6/2008 |

(Continued)

OTHER PUBLICATIONS

The extended European search report issued by the European Patent Office dated May 28, 2015, which corresponds to European Patent Application No. 12848800.4-1804 and is related to U.S. Appl. No. 14/358,454.

(Continued)

*Primary Examiner* — Rexford Barnie
*Assistant Examiner* — Xuan Ly
(74) *Attorney, Agent, or Firm* — Procopio Cory Hargreaves and Savitch LLP

(57) ABSTRACT

A power supply system (101) includes a first power supply apparatus (111*a*) and a second power supply apparatus (111*b*) connected to a load in parallel, for supplying power to the load (115). The first supply apparatus (111*a*) includes a first controller that controls the output voltage of the first supply apparatus (111*a*) when a power supply from the first supply apparatus (111*a*) to the load 115 is equal to or greater than a power requirement by the load (115), and controls the output current of the first supply apparatus (111*a*) when the supplied power is less than the required power. The second power supply apparatus 111*b* includes a second controller (Continued)

that stops the second supply apparatus from supplying power (111b) when the power supply is equal to or greater than the power requirement, and controls the output voltage of the power supply apparatus (111b) when the power supply is less than the power requirement.

6 Claims, 8 Drawing Sheets

(51) Int. Cl.
    *H02J 3/32*         (2006.01)
    *H02J 1/10*         (2006.01)
    *H02J 1/12*         (2006.01)

(52) U.S. Cl.
    CPC . *H02J 1/10* (2013.01); *H02J 1/12* (2013.01); *H02J 3/32* (2013.01); *Y10T 307/702* (2015.04)

(56) References Cited

FOREIGN PATENT DOCUMENTS

| JP | 08-019193 | * | 1/1996 |
|----|-----------|---|--------|
| JP | H08-19193 A | | 1/1996 |
| JP | 11-089096 | * | 3/1999 |
| JP | H11-89096 A | | 3/1999 |
| JP | 2000-020150 A | | 1/2000 |
| JP | 2005-245050 | * | 9/2005 |
| JP | 2005-245050 A | | 9/2005 |
| JP | 2007-287567 A | | 11/2007 |

OTHER PUBLICATIONS

International Search Report; PCT/JP2012/007062; dated Feb. 5, 2013.

* cited by examiner

POWER SUPPLY APPARATUS, POWER SUPPLY SYSTEM, AND METHOD FOR CONTROLLING POWER SUPPLY SYSTEM

CROSS REFERENCE TO RELATED APPLICATION

The present application claims the priority of Japanese Patent Application No. 2011-249374 filed on Nov. 15, 2011, the content of which is entirely incorporated herein by reference.

TECHNICAL FIELD

The present invention relates to a power supply apparatus, a power supply system, and a method for controlling the power supply system.

BACKGROUND

Power supply apparatuses include, for example, those that convert electric power generated by natural energy into grid electric power (hereinafter referred to as natural-energy power supply apparatuses) and those that convert electric power generated by energy other than natural energy into grid electric power (hereinafter referred to as nonnatural-energy power supply apparatuses).

The natural-energy power supply apparatus includes, for example, a solar power supply apparatus that converts power output from solar cells (solar panels). Examples of the solar power supply apparatus known in the art include those that enable grid-interconnected operation for outputting AC power in connection with a mains of grid (hereinafter occasionally abbreviated as a grid) and those that enable independent operation for outputting AC power independently of the grid.

The nonnatural-energy power supply apparatus includes, for example, a fuel cell power supply apparatus or a rechargeable battery power supply apparatus. Similarly to the aforementioned natural-energy power supply apparatuses, the nonnatural-energy power supply apparatuses also enable the grid-interconnected operation and the independent operation. With a constant maximum generated power at the independent operation, the nonnatural-energy power supply apparatus is capable of outputting electric power almost stably at any time. Moreover, for the fuel cell power supply apparatus, there has been known a fuel cell system in which multiple fuel cell power supply apparatuses are connected in parallel, to thereby increase the power generation efficiency of the fuel cell as a whole even when subjected to load changes (for example, see JP 2007-287567 A (PTL 1)).

CITATION LIST

Patent Literature

PTL 1: JP 2007-287567 A

SUMMARY OF INVENTION

However, PTL 1 intends to connect only fuel cell power supply apparatuses in parallel, not intending to connect different types of power supply apparatuses, i.e., natural- and nonnatural-energy power supply apparatuses, in parallel. Although the use of natural-energy power supply apparatuses is desired in view of the finite nature of exhaustible fuels and the necessity of reducing global warming, the maximum generated power thereof is affected by the amount of solar radiation, air volume, etc. The output power of the natural-energy power supply apparatus thus varies with time.

In light of the above, in order to stabilize the power output from a system which employs a natural-energy power supply apparatus, it may be intended to combine the natural-energy power supply apparatus with the nonnatural-energy power supply apparatus that is capable of stably outputting power. However, no specific method has been discussed for controlling such a combined system, i.e., how to use different types of power supply apparatuses properly in one system. This still makes it difficult to allow the power supply apparatus system including different types of power supply apparatuses to stably supply electric power to a load as one system.

In view of the aforementioned problems, the present invention is to provide a power supply apparatus, a power supply system, and a method for controlling the power supply system, which are capable of stably supplying electric power to a load using different types of power supply apparatuses combined into one system as a whole.

To solve the aforementioned problems, a power supply system according a first aspect of the present invention includes:
- a first power supply apparatus configured to operate independently; and
- a second power supply apparatus configured to supply power to a load to which AC power output from the first power supply apparatus is supplied, the first power supply apparatus and the second power supply apparatus being each connected to the load in parallel, such that
- the first power supply apparatus includes a first controller configured to control an output voltage of the first power supply apparatus when power supply supplied from the first power supply apparatus to the load is equal to or greater than power requirement required by the load, and to control an output current of the first power supply apparatus when the power supply is less than the power requirement, and
- the second power supply apparatus includes a second controller configured to stop the second power supply apparatus from supplying power when the power supply is equal to or greater than the power requirement, and to control an output voltage of the second power supply apparatus when the power supply is less than the power requirement.

According to a second aspect of the present invention, in the power supply system according to the first aspect,
- the first power supply apparatus further includes an inverter configured to convert DC power into AC power and to supply the AC power to the load, and
- the first controller is configured to determine that the power supply is less than the power requirement based on a voltage input to the inverter being less than a predetermined voltage.

According to a third aspect of the present invention, in the power supply system according to the first or second aspect,
- the first power supply apparatus further includes a first communication interface for sending and receiving a signal to and from the second power conditioner,
- the second power supply apparatus further includes a second communication interface for sending and receiving a signal to and from the first power conditioner, the second communication interface connecting with the first communication interface, the first controller is configured to send a synchronization signal, which instructs to start controlling the output voltage, to the second power supply apparatus via the first communication interface when the power supply becomes less than the power requirement, and the second controller is configured to send a synchronization signal, which instructs to start controlling the output voltage, to the first power supply apparatus via the second communication interface when the power supply becomes equal to or greater than the power requirement.

According to a fourth aspect of the present invention, in the power supply system according to the first or second aspect, the first controller is configured to change, when the power supply becomes less than the power requirement, the voltage output from the first power supply apparatus such that the voltage satisfies a first effective-value condition, and the second controller is configured to change, when the power supply becomes equal to or greater than the power requirement, the voltage output from the second power supply apparatus such that the voltage satisfies a second effective-value condition.

According to a fifth aspect of the present invention, in the power supply system of the first or second aspect, the first controller is configured to change, when the power supply becomes less than the power requirement, the voltage output from the first power supply apparatus such that the frequency satisfies a first frequency condition, and the second controller is configured to change, when the power supply becomes equal to or greater than the power requirement, the voltage output from the second power supply apparatus such that the frequency satisfies a second frequency condition.

According to a sixth aspect of the present invention, in the power supply system according to the first aspect, the first power supply apparatus is for outputting electric power from natural energy, and the first controller is configured input a maximum output operation voltage obtained by using maximum power point tracking (MPPT) to the inverter when the output current of the first power supply apparatus is controlling the output current.

A power supply apparatus according a seventh aspect of the present invention is configured to operate independently, the power supply apparatus being connected to a load in parallel with another power conditioner, the another power supply apparatus configured to supply power to the load to which power is supplied from the power conditioner, wherein the power supply apparatus includes a controller configured to:

control an output voltage of the power supply apparatus when power supply supplied from the power supply apparatus to the load is equal to or greater than power requirement required by the load; and control an output current of the power supply apparatus and instruct the another power supply apparatus to control an output voltage of the another power supply apparatus when the supplied power is less than the power requirement.

Although the means for solving the problems has been described as an apparatus in the above, the present invention may be also implemented as a method, a program, or a recording medium recording the program thereon each substantially corresponding to such an apparatus. It should be appreciated that such a method, a program, or a recording medium recording the program thereon may be also included in the scope of the present invention.

For example, according to an eighth aspect of the present invention, the present invention is implemented as a method for controlling a power supply system that includes a first power supply apparatus configured to operate independently and a second power supply apparatus configured to supply power to a load to which AC power output is supplied from the first power conditioner, the first power supply apparatus and the second power supply apparatus being each connected to the load in parallel, the method including the steps of:

causing the first power supply apparatus
  to control an output voltage of the first power supply apparatus when
 power supplied from the first power supply apparatus to the load is equal to or greater than power required by the load, and
  to control an output current of the first power supply apparatus when power supply supplied from the first power supply apparatus is less than the power requirement required by the load; and causing the second power conditioner
  to stop the second power supply apparatus from supplying power when the power supply is equal to or greater than the power requirement, and
  to control an output voltage of the second power supply apparatus when the power supply is less than the power requirement.

The power supply system, the power conditioner, and the method of controlling the power supply system according to the present invention configured as above are capable of stably supplying electric power to a load using different types of power supply apparatuses combined into one system as a whole.

BRIEF DESCRIPTION OF DRAWINGS

The present invention will be further described below with reference to the accompanying drawings, wherein.

DESCRIPTION OF EMBODIMENTS

In the following, embodiments according to the present invention will be described with reference to the drawings.

(First Embodiment)

Figure 1:
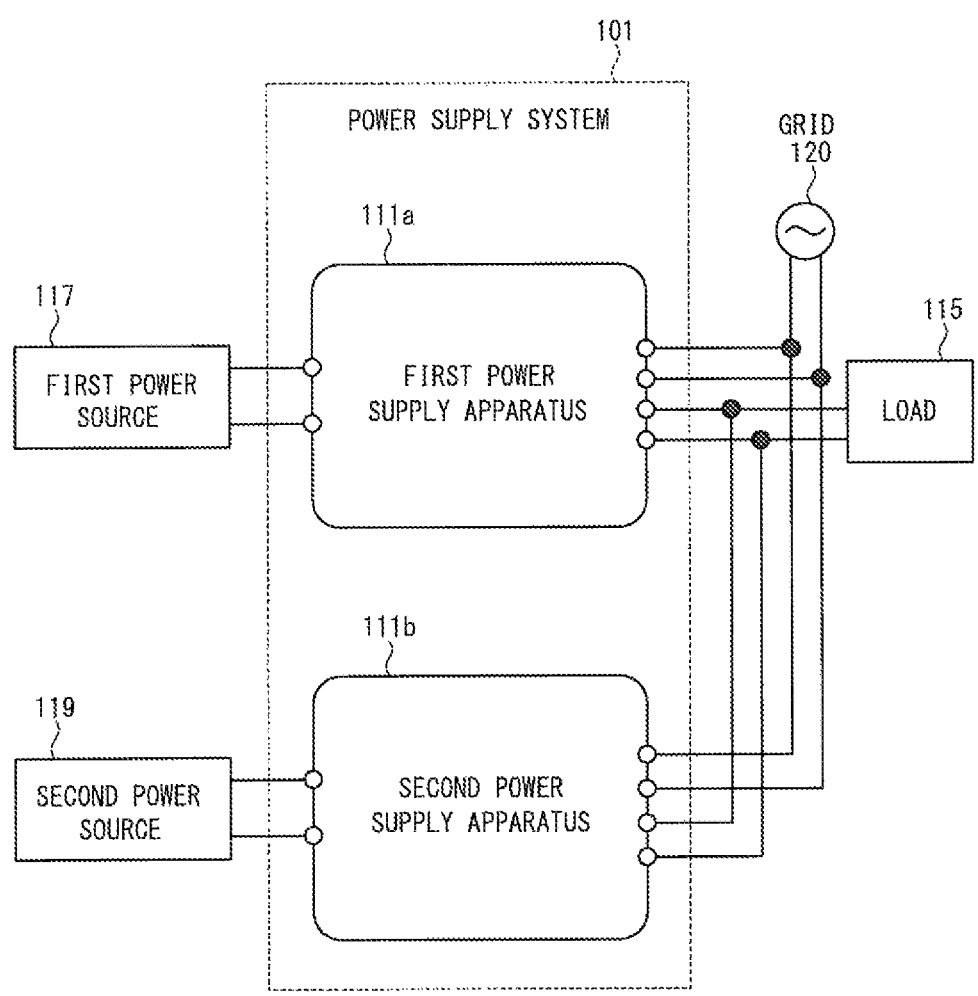
FIG. 1 is a schematic block diagram of a power supply system according to a first embodiment of the present invention.

FIG. 1 is a schematic block diagram of a power supply system according to a first embodiment of the present invention. A power supply system 101 includes a first power supply apparatus 111a that operates independently, and a second power supply apparatus 111b that is of a type different from the first power supply apparatus 111a and covers the shortage of the AC power output from the first power supply apparatus 111a to a load 115. The first power supply apparatus 111a converts the electric power from a first power source 117 into AC power. The second power supply apparatus 111b converts the electric power from a second power source 119 into AC power. The different types of power supply apparatuses refer to supply apparatuses that are each intended for different kinds of power sources. The load 115 here is, for example, consumer electronics, such as a TV (television receiver), a refrigerator, etc. An AC current flows between the load 115 and the first power supply apparatus 111a and between the load 115 and the second power supply apparatus 111b, while a DC current flows between the first power supply apparatus 111a and the first power source 117 and between the second power supply apparatus 111b and the second power source 119.

As illustrated in FIG. 1, the first power supply apparatus 111a and the second power supply apparatus 111b may be connected to a mains of grid 120. The first power supply apparatus 111a and the second power supply apparatus 111b operate in connection with the grid 120 to supply AC power to the load 115.

In this embodiment, the first power supply apparatus 111a is hereinafter regarded as a solar power conditioner, one type of a power supply apparatus that outputs electric power from natural energy, and thus the first power source 117 may be identified as a solar cell. Other examples of the power supply apparatuses that output electric power from natural energy include wind-power generation and wave-power generation power supply apparatuses. Examples of the second power conditioner, being of a different type from the solar power supply apparatus 111a, include for example a fuel cell power supply apparatus and a rechargeable battery power conditioner. In this embodiment, the second power supply apparatus 111b is regarded as a fuel cell power conditioner, and thus the second power source 119 may be identified as a fuel cell.

Figure 2:
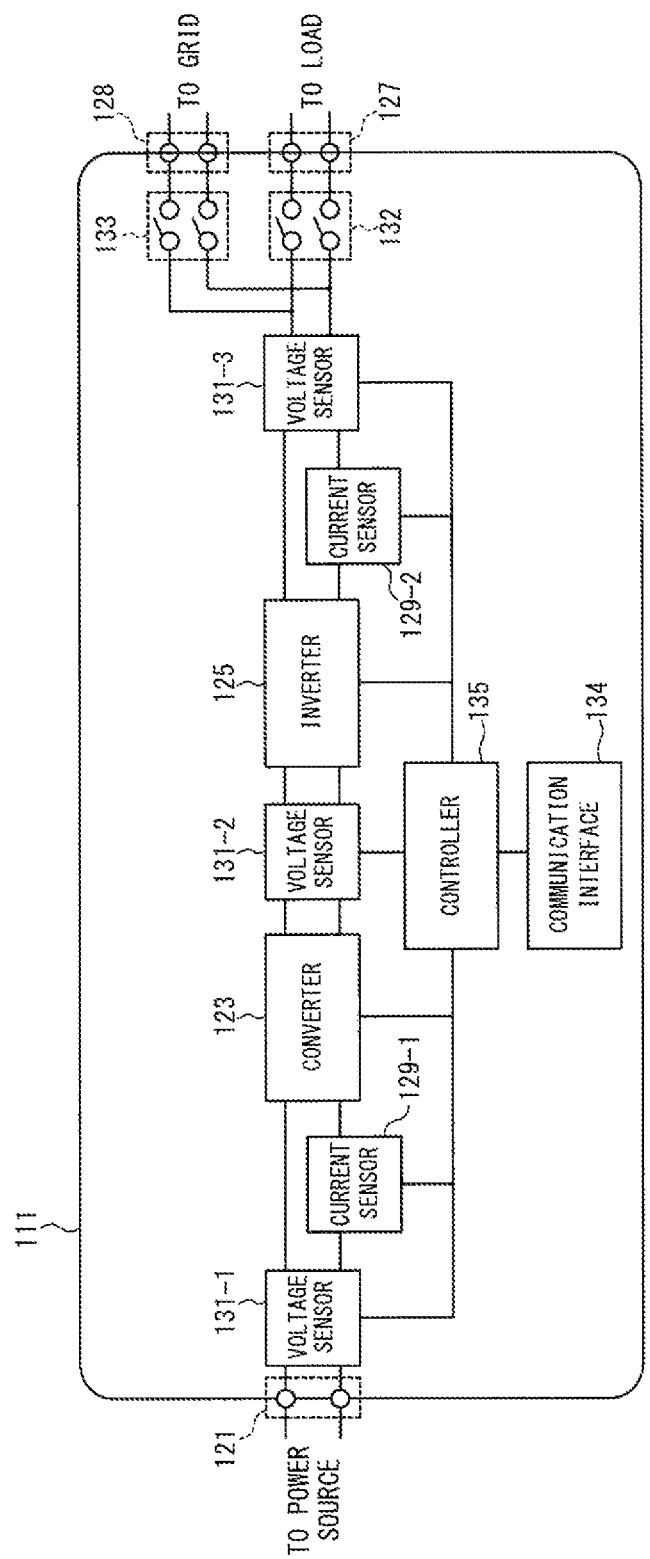
FIG. 2 is a function block diagram illustrating a schematic configuration of the power supply apparatus according to the first embodiment of the present invention.

FIG. 2 is a function block diagram illustrating a schematic configuration of the power supply apparatus according to the first embodiment of the present invention. The solar power supply apparatus 111a and the fuel cell power supply apparatus 111b, which differ from each other only in their corresponding power sources, both have the function blocks for the power supply apparatus 111 illustrated in FIG. 2. In the following description, elements denoted by reference numerals each having "a" attached to its end represent the function blocks for the solar power supply apparatus 111a, and elements denoted by reference numerals each having "b" attached to its end represent the function blocks for the fuel cell power supply apparatus 111b.

The power supply apparatus 111 (111a and 111b) includes a power terminal 121, a convertor 123, an inverter 125, a load terminal 127, a grid terminal 128, current sensors 129-1 and 129-2, voltage sensors 131-1, 131-2, and 131-3, an autonomous output switch 132, a parallel switch 133, a communication interface 134, and a controller 135. The power terminal 121 is connected to the converter 123, the converter 123 is connected to the inverter 125, and the inverter 125 is connected to the load terminal 127 through the independent output switch 132 and is also connected to the grid terminal 128 through the parallel switch 133.

The current sensor 129-1 and the voltage sensor 131-1 are disposed between the power terminal 121 and the converter 123, while the voltage sensor 131-2 is disposed between the converter 123 and the inverter 125. The current sensor 129-2 and the voltage sensor 131-3 are provided between the inverter 125 and load terminal 127. The controller 135 is connected to the converter 123, the inverter 125, the current sensors 129-1 and 129-2, the voltage sensors 131-1, 131-2, and 131-3, and the communication interface 134.

The power terminal 121 is for connecting the solar cell 117 with the power supply apparatus 111 or for connecting the fuel cell 119 with the power supply apparatus 111. The power terminal 121 is connected to the converter 123.

The converter 123 increases or decreases the DC voltage (DC power) generated by the solar cell 117 or the fuel cell 119 to supply the increased or decreased DC voltage (DC power) to the inverter 125. The converter is, for example, a one-way converter.

The inverter 125 converts the DC voltage (DC power) increased or decreased by the converter 123 into a standard AC voltage (AC power) to supply the converted AC voltage to the load 115 through the load terminal 127 or to the grid 120 through the grid terminal 128. The inverter 125 is, for example, a one-way inverter. The standard AC voltage is, for example, the AC voltage used in the grid, which has an effective value of 100 volts and a frequency of 50 Hz or 60 Hz in Japan, for example.

The load terminal 127 is for connecting the load 115 with the power supply apparatus 111.

The grid terminal 128 is for connecting the grid 120 with the power supply apparatus 111.

The current sensor 129-1 measures the DC current from the solar cell 117 or from the fuel cell 119, and the current sensor 129-2 measures the AC current from the inverter 125, respectively. The current sensors 129-1 and 129-2 then send the measurement results to the controller 135.

The voltage sensor 131-1 measures the DC voltage from the solar cell 117 or the fuel cell 119, the voltage sensor 131-2 measures the DC voltage from the converter 123, and the voltage sensor 131-3 measures the AC voltage from the inverter 125, respectively. The voltage sensors 131-1, 131-2, and 131-3 then send the results of the measurement to the controller 135.

The independent output switch 132 and the parallel switch 133 are turned on/off by relays that are operated independently from each other. The independent output switch 132 connects/disconnects the connection between the inverter 125 and the load 115. When the independent output switch 132 is on, the AC power output from the inverter 125 is supplied to the load 115. The parallel switch 133 connects/disconnects the connection between the inverter 125 and the grid 120. When the parallel switch 133 is on, the AC power output from the inverter 125 may be supplied to the grid 120 as a reverse power flow. When the independent output switch 132 and the parallel switch 133 are both on, the power supply apparatus 111 operates in connection with the grid 120 to be able to supply AC power to the load 115. In the present embodiment, the system is set such that a power outage in the grid 120 may turn on the independent output switch 132 and turns off the parallel switch 133 to allow the power supply apparatus 111 to operate independently.

The communication interface 134 enables signal transmission among multiple power supply apparatuses 111. This means that the solar power supply apparatus 111a may send/receive signals to/from the fuel cell power supply apparatus 111b via the communication interfaces 134a and 134b. Note here however that the communication interface 134 is not an essential function block for the power supply apparatus 111.

The controller 135 controls and manages the overall operation of the power supply apparatus 111, including the operation of each function block of the power supply apparatus 111, based on the measurement results from the current sensors 129-1 and 129-2 and the voltage sensors 131-1, 131-2, and 131-3, and on the signals or the like sent from other power supply apparatuses via the communication interface 134. The controller 135 may be configured as a piece of software executed in any suitable processor such as a CPU (central processing unit), or may be configured with a dedicated processor, such as a DSP (digital signal processor), specialized for each process. The procedures performed by the controller 135 will be described in detail below with reference to FIG. 3.

Figure 3:
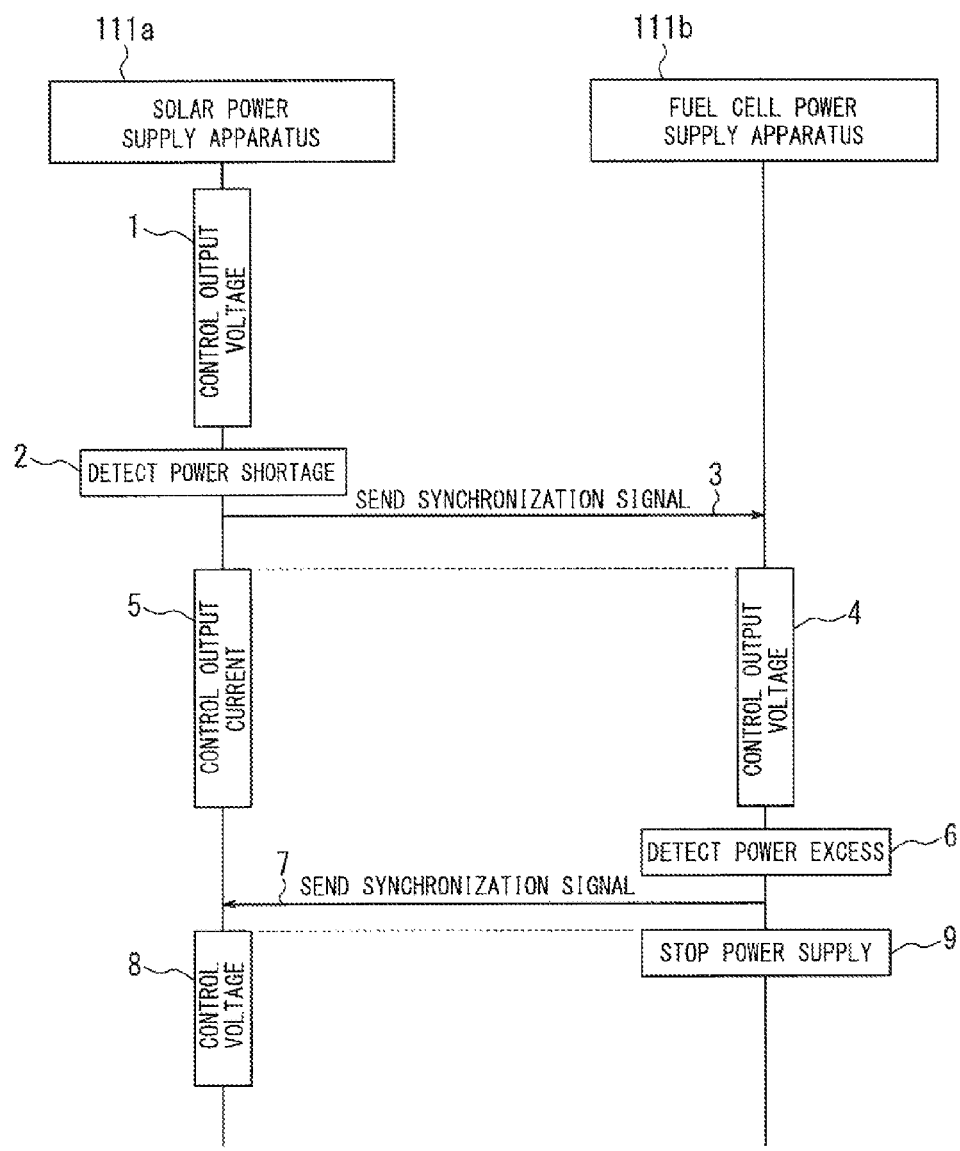
FIG. 3 is a sequence diagram illustrating procedures performed by two power supply apparatuses according to the first embodiment of the present invention.

The following describes how to control the power supply system 101 to supply power to load 115 with reference to FIG. 3. FIG. 3 is a sequence diagram illustrating the procedures performed by the two power supply apparatuses according to the first embodiment of the present invention.

First, assumed is a case where the solar cell 117 generates power sufficient for the load 115; that is, the power supplied to the load 115 from the solar power supply apparatus 111a is equal to or greater than the power required by the load 115. In this case, the controller 135b (identified as a second controller in the appended claims) stops the operation of inverter 125b so as to stop the fuel cell power supply apparatus 111b from supplying power to the load 115.

When the power supplied from the solar power supply apparatus 111a is equal to or greater than the power required by the load 115, the controller 135a (identified as a first controller in the appended claims) controls the output voltage of the solar power supply apparatus 111a (Step 1 of FIG. 3), based on the measurement from the voltage sensor 131a-3, such that the voltage at the voltage sensor 131a-1 meets a standard voltage. In more detail, the controller 135a controls the inverter 125a such that the inverter 125a may output the standard voltage. The controller 135a controls the converter 123a, based on the measurement from the voltage sensor 131a-1, such that the converter 123a may output a predetermined voltage required for the inverter 125a to output the standard voltage.

Next, assumed is a case where the power generated by the solar cell 117 is insufficient for the load 115; that is, the power supplied from the solar power supply apparatus 111a becomes less than the power required by the load 115. In this case, the converter 123a may no longer be able to output the predetermined voltage that is, the voltage input to the inverter 125a becomes less than the predetermined voltage. The controller 135a detects, based on the measurement from the voltage sensor 131a-2, that the voltage input to the inverter 125a has decreased to be less than the predetermined voltage. The controller 135a then determines that the power from the solar cell 117 is insufficient for the load 115 (Step 2 of FIG. 3). Note here that the power shortage for the load 115 caused by the solar cell 117 is determined not only by the measurement from the voltage sensor 131a-2 but also by the measurement from the voltage sensor 131a-3, since failure of the converter 123a to output the predetermined voltage also disables the inverter 125a to output the standard voltage.

Subsequently, the controller 135a sends, via the communication interface 134a (identified as a first communication interface in the appended claims), a synchronization signal to the fuel cell power supply apparatus 111b, instructing to start controlling the output voltage (Step 3 of FIG. 3). Upon receiving the synchronization signal via the communication interface 134b (identified as a second communication interface in the appended claims), the controller 135b of the fuel cell power supply apparatus 111b starts controlling the output voltage of the fuel cell power supply apparatus 111b (Step 4 of FIG. 3). In other words, the controller 135b controls the converter 123b and inverter 125b, based on the measurement from the voltage sensor 131b-3, such that the voltage at the voltage sensor 131b-3 meets the standard voltage.

Upon sending the synchronization signal, the controller 135a of the solar power supply apparatus 111a starts controlling the output current of the solar power supply apparatus 111a (Step 5 of FIG. 3). In more detail, the controller 135a controls the inverter 125a, based on the measurement from the voltage sensor 131a-3 and the current sensor 129a-2, such that the output current of the inverter 125a may have a power factor of 1 with respect to the output voltage of the inverter 125a.

While the controller 135a of the solar power supply apparatus 111a stops controlling the output voltage of the solar power supply apparatus 111a, the fuel cell power supply apparatus 111b connected in parallel with the solar power supply apparatus 111a starts outputting the standard voltage. The power supply system 101 as a whole may thus supply the standard voltage to the load 115.

Figure 4:
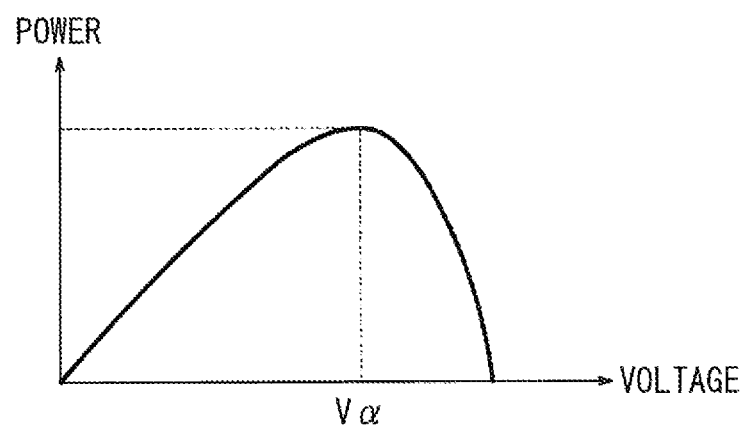
FIG. 4 is a graph illustrating output characteristics of a solar cell according to the first embodiment of the present invention.

During when the current through the solar power supply apparatus 111a is controlled by the controller 135a, the output power of the inverter 125a may be maximized by maximizing the output power from the converter 123a using max power point tracking (MPPT). FIG. 4 illustrates characteristics of the output power of a solar cell 117 with respect to the output voltage. For each light amount incident on the cell, the output power of the solar cell 117 has a maximum output operation voltage Va, at which the output power is maximum. MPPT enables the controller 135a to obtain the output power of the solar cell 117 by multiplying the voltage value indicated by the voltage sensor 131a-1 by the current value indicated by the current sensor 129a-1. The controller 135a controls the amount of load consuming the output power of the solar cell 117 (e.g., impedance or input current of the converter 123a) to allow the output power from the converter 123a to track the maximum output operation voltage Va for any amount of incident light. This enables the controller 135a to input the maximum output operation voltage Va to the inverter 125a. Note here that MPPT may be performed not only on the power supply apparatus using a solar cell as the first power source 117, but also on the first power supply apparatus that uses any other natural energy as the first power source 117. The controller 135a may thus performs MPPT also on the power supply apparatus that uses wind-power generation or water-power generation as the first power source 117, for example.

Now assumed is a case where the power supplied to the load 115 becomes excessive due to the increased generated power by the solar cell 117 or reduced power consumption by the load 115; that is, the power supplied from the solar power supply apparatus 111a becomes equal to or greater than that required by the load 115. In this case, the output current of the fuel cell power supply apparatus 111*b* controlling the output voltage becomes less. When the effective value of the current measured by the current sensor 129*b*-2 becomes less than the predetermined threshold for determining the excess of power supplied to the load 115, the controller 135*b* detects that the power supplied to the load 115 is excessive (Step 6 of FIG. 3). The controller 135*b* then sends a synchronization signal to the solar power supply apparatus 111*a* via the communication interface 134*b*, instructing to start controlling the output voltage (Step 7 of FIG. 3).

Upon receiving the synchronization signal via the communication interface 134*a*, the controller 135*a* of the solar power supply apparatus 111*a* stops controlling the output current of the solar power supply apparatus 111*a* and starts controlling the output voltage (Step 8 of FIG. 3).

Upon sending the synchronization signal, the controller 135*b* stops the operation of the inverter 125*b* so as to stop the fuel cell power supply apparatus 111*b* from supplying power (Step 9 of FIG. 3). While the power supply is stopped, the fuel cell power supply apparatus 111*b* is able to be charged with the power output from the solar power supply apparatus 111*a*.

As described above, in the present embodiment, when the power supplied from the solar power supply apparatus 111*a* to the load 115 is equal to or greater than the power required by the load 115, the controller 135*a* controls the output voltage of the solar power supply apparatus 111*a*, and when the power supplied from the solar power supply apparatus 111*a* is less than the required power, the controller 135*a* controls the output current of the solar power supply apparatus 111*a*. When the power supplied from the solar power supply apparatus 111*a* is equal to or greater than the required power, the controller 135*b* stops the fuel cell power supply apparatus 111*b* from supplying the power, and when the power supplied from the solar power supply apparatus 111*a* is less than the required power, the controller 135*b* controls the output voltage of the fuel cell power supply apparatus 111*b*. In short, when the solar cell 117 generates a large amount of power, the solar power supply apparatus 111*a* alone is able to supply stable power to the load 115, not requiring the use of the fuel cell 119. In a word, the solar cell 117 being a natural energy is used more regularly than the fuel cell 119. Conversely, when the solar cell 117 generates only a small amount of power, the fuel cell power supply apparatus 111*b* starts functioning to allow the controller 135*b* to control the output voltage of the fuel cell power supply apparatus 111*b*. The system is accordingly capable of supplying a stable standard voltage to the load 115 even when the power generated by the solar cell 117 is low. Furthermore, the parallel connection of the solar power supply apparatus 111*a* and the fuel cell power supply apparatus 111*b* enables the controller 135*a* to control the output current of the solar power supply apparatus 111*a* during when the fuel cell power supply apparatus 111*b* controls the output voltage. For example, when the generated power of the solar cell 117 is relatively less than the amount of power for the load, the controller 135*a* may use MPPT to allow the solar cell 117 to operate at its maximum output operation voltage. This maximizes the output power of the solar power supply apparatus 111*a*, allowing maximum use of solar light.

Moreover, in the present embodiment, the controller 135*a* may determine that the power supplied from the solar power supply apparatus 111*a* is less than the required power when the input voltage to the inverter 125*a* becomes less than the predetermined voltage value. This allows the system to identify the lowering of power generation in the solar cell 117 at an early stage, since the controller 135*a* may determine the shortage of the supplied power from the solar power supply apparatus 111*a* by the input voltage to the inverter 125*a*, rather than by the output voltage from the inverter 125*a*.

Furthermore, in the present embodiment, when the power supplied from the solar power supply apparatus 111*a* becomes less than the required power, the controller 135*a* sends the synchronization signal to the fuel cell power supply apparatus 111*b* via the communication interface 134*a*, instructing to start controlling the output voltage while allowing the controller 135*b* to identify when to start controlling the output voltage of the fuel cell power supply apparatus 111*b*. Moreover, the controller 135*a* starts controlling the output current of the solar power supply apparatus 111*a* upon sending the synchronization signal. These allow the system to start controlling the current of the solar power supply apparatus 111*a* and start controlling the voltage of the fuel cell power supply apparatus 111*b* in synchronization. Conversely, when the power supplied from the solar power supply apparatus 111*a* becomes equal to or greater than the required power, the controller 135*b* sends the synchronization signal to the solar power supply apparatus 111*a* via the communication interface 134*b*, instructing to start controlling the output voltage. This allows the controller 135*a* to identify when to start controlling the output voltage of the solar power supply apparatus 111*a*. Moreover, the controller 135*b* stops the fuel cell power supply apparatus 111*b* from supplying power upon sending the synchronization signal. These allow the system to start controlling the voltage of the solar power supply apparatus 111*a* and start controlling the current of the fuel cell power supply apparatus 111*b* in synchronization.

(Second Embodiment)

While the first embodiment achieves switching of the controlling scheme (current control, voltage control, and power supply stop) between the power supply apparatuses through transmission of the synchronization signals via the communication interfaces, a second embodiment achieves the same through changing the effective values of the output voltages of the power supply apparatuses. The elements included in a power supply system 201 according to the second embodiment are identical to those of the power supply system 101 of the first embodiment. The first power supply apparatus (solar power conditioner) is denoted as 211*a* and the second power supply apparatus (fuel cell power conditioner) is denoted as 211*b*. The first power supply apparatus 211*a* and the second power supply apparatus 211*b* are connected in parallel to a load 215, similarly to the first embodiment, and a first power source (solar cell) 217 is connected to the first power supply apparatus 211*a* and a second power source (fuel cell) 219 is connected to the second power supply apparatus 211*b*. The first and second power supply apparatuses 211*a* and 211*b* may be connected to a grid 220.

The elements included in a power supply apparatus 211 (211*a* and 211*b*) according the second embodiment are same as those of the power supply apparatus 111 of the first embodiment, except for the communication interface 134. The power supply apparatus 211 includes a power terminal 221, a convertor 223, an inverter 225, a load terminal 227, a grid terminal 228, current sensors 229-1 and 229-2, voltage sensors 231-1, 231-2, and 231-3, an independent output switch 232, a parallel switch 233, and a controller 235. The functions of the power terminal 221, the converter 223, the inverter 225, the load terminal 227, the grid terminal 228, the current sensors 229-1 and 229-2, the voltage sensors 231-1, 231-2, and 231-3, the independent output switch 232, and the parallel switch 233 are identical to those of the power terminal 121, the converter 123, the inverter 125, the load terminal 127, the grid terminal 128, the current sensors 129-1 and 129-2, the voltage sensors 131-1, 131-2, and 131-3, the independent output switch 132, and the parallel switch 133 of the first embodiment. The explanations thereof are thus omitted.

Similarly to the first embodiment, elements with reference numerals each having "a" attached to its end represent the function blocks for the solar power supply apparatus 211a, and elements with reference numerals each having "b" attached to its end represent the function blocks for the fuel cell power supply apparatus 211b.

Figure 5:
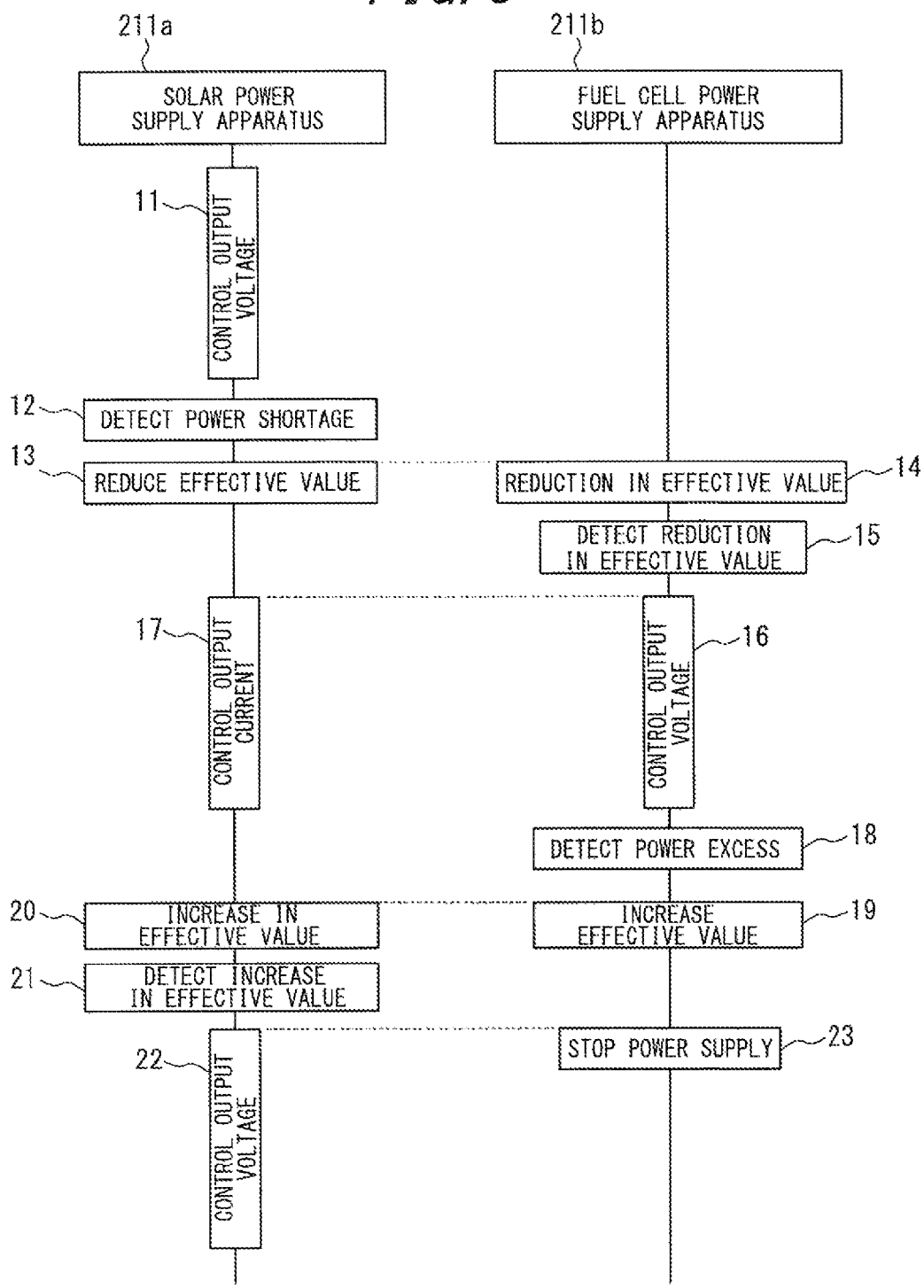
FIG. 5 is a sequence diagram illustrating processes of two power supply apparatuses according to a second embodiment of the present invention.

The following describes how to control the power supply system 201 to supply power to the load 215, with reference to FIG. 5. FIG. 5 is a sequence diagram illustrating the procedures performed by the two power supply apparatuses according to the second embodiment of the present invention. Steps 11, 12, 16, 17, 18, 22, and 23 of FIG. 5 are performed similarly to Steps 1, 2, 4, 5, 6, 8, and 9 of FIG. 3, respectively. The explanations thereof are thus omitted.

First, assumed is a case where the power supplied from the solar power supply apparatus 211a becomes less than the required power, which causes a power shortage at the load 215 (Step 12 of FIG. 5). In this case, the controller 235a changes the voltage output from the solar power supply apparatus 211a such that the voltage satisfies a first effective-value condition, in order to instruct the controller 235b to start controlling the voltage output from the fuel cell power supply apparatus 211b. The first effective-value condition may be defined, for example, as that the effective value of the voltage output from the solar power supply apparatus 211a becomes less than a threshold value A1 (threshold value A1<effective value of the standard voltage) or as that the effective value of the same becomes equal to or greater than a threshold value A2 (threshold value A2>effective value of the standard voltage). Alternatively, the controller 235a may determine that the effective value stays, for a certain period of time, in a value less than the threshold value A1 or stays in a value equal to or greater than the threshold value A2 before determining that the first effective value condition is satisfied, because turning on/off the switch of the load 215 may sometimes cause the effective value to temporarily fall below the threshold value A1 or become equal to or greater than the threshold value A2. Hereinafter, in the present embodiment, the first effective-value condition is regarded as being satisfied when the effective value of the voltage output from the solar power supply apparatus 211a becomes less than the threshold value A1. The controller 235a thus controls the inverter 225a to thereby reduce the effective value of the output voltage until the value becomes less than the threshold value A1 (Step 13 of FIG. 5 and time t1 of FIG. 6). Here, the threshold value A1 may be set, for example, to be in an allowable range of the effective value for the AC voltage of the grid 220, which allows the effective value of the output voltage to be reduced without adversely affecting the load 215. The threshold value A1 may be also set to be in a range that does not cause flicker influences to the load 215. Furthermore, the controller 235a may change the voltage output from the solar power supply apparatus 211a near the zero-crossing point of such a voltage, in order to prevent the occurrence of harmonics.

As the effective value of the output voltage of the inverter 225a of the solar power supply apparatus 211a decreases, the effective value of the output voltage of the fuel cell power supply apparatus 211b connected in parallel with the solar power supply apparatus 211a also decreases (Step 14 of FIG. 5). The controller 235b accordingly detects, based on the measurement from the voltage sensor 231b-3, that the effective value of the voltage at the voltage sensor 231b-3 has become less than the threshold value A1 (Step 15 of FIG. 5). The controller 235b then identifies that the power supplied from the solar power supply apparatus 211a has become less than the required power.

Upon determining that the effective value of the voltage at the voltage sensor 231b-3 has become less than the threshold value A1, the controller 235b starts controlling the voltage output from the fuel cell power supply apparatus 211b (Step 16 of FIG. 5). Meanwhile, upon determining that the effective value of the voltage output of the inverter 225a has decreased to a value less than the threshold value A1, the controller 235a starts controlling the output current of the solar power supply apparatus 211a (Step 17 of FIG. 5).

Next, assumed is a case where the power supplied from the solar power supply apparatus 211a becomes equal to or greater than the required power; that is, the power supply is excessive (Step 18 of FIG. 5). The controller 235b changes the voltage output from the fuel cell power supply apparatus 211b such that the voltage satisfies a second effective-value condition. The second effective-value condition may be defined, for example, as that the effective value of the voltage output from the fuel cell power supply apparatus 211b becomes equal to or greater than a threshold value B1 (threshold value B1>effective value of the standard voltage) or as that the effective value of the same becomes less than a threshold value B2 (threshold value B2<effective value of the standard voltage). Alternatively, the controller 235b may determine that the effective value stays, for a certain period of time, in a value equal to or greater than the threshold value B1 or stays in a value less than the threshold B2 before determining that the second effective value condition is satisfied, because turning on/off the switch of the load 215 may sometimes cause the effective value to temporarily become equal to or greater than the threshold value B1 or fall below the threshold value B2. Hereinafter, in the present embodiment, the second effective-value condition is regarded as being satisfied when the effective value of the voltage output from the fuel cell power supply apparatus 211b becomes equal to or greater than the threshold value B1. The controller 235b thus controls the inverter 225b to thereby increase the effective value of the output voltage until the value becomes equal to or greater than the threshold value B1 (Step 19 of FIG. 5 and time t2 of FIG. 6). Here, the threshold value B1 may be set, for example, to be in an allowable range of the effective value for the AC voltage of the grid 220, which allows the effective value of the output voltage to be increased without adversely affecting the load 215. The threshold value B1 can be also set to be in a range that does not cause flicker influences to the load 215. Furthermore, the controller 235b can change the voltage output from the fuel cell power supply apparatus 211b near the zero-crossing point of such a voltage, in order to prevent the occurrence of harmonics.

As the effective value of the output voltage of the inverter 225b of the fuel cell power supply apparatus 211b increases, the effective value of the output voltage of the solar power supply apparatus 211a connected in parallel to the fuel cell power supply apparatus 211b also increases (Step 20 of FIG. 5). The controller 235a accordingly detects, based on the measurement from the voltage sensor 231a-3, that the effective value of the voltage at the voltage sensor 231b-3 has become equal to or greater than the threshold value B1 (Step 21 of FIG. 5). The controller 235a then identifies that the power supplied from the solar power supply apparatus 211a has become equal to or greater than the required power.

Upon determining that the effective value of the voltage at the voltage sensor 231a-3 has become equal to or greater than the threshold value B1, the controller 235a stops controlling the output current of the solar power supply apparatus 211a but starts controlling the output voltage (Step 22 of FIG. 5). Meanwhile, upon determining that the effective value of the voltage output from the inverter 225b has increased to a value equal to or greater than the threshold value B1, the controller 235b stops the fuel cell power supply apparatus 211b from supplying power (Step 23 of FIG. 5).

Figure 6:
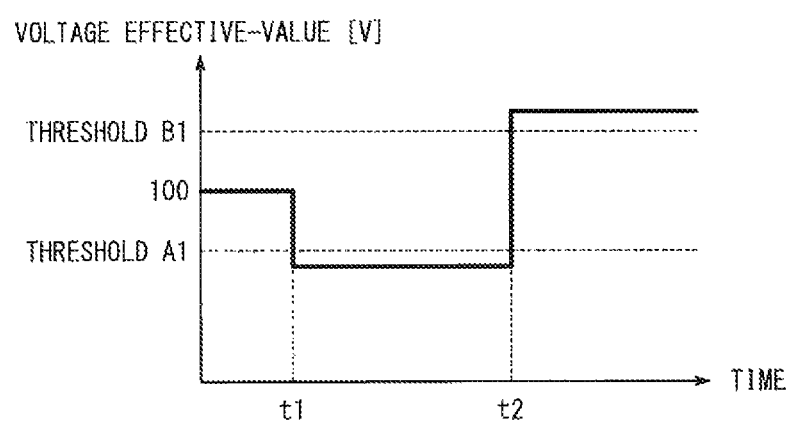
FIG. 6 is a graph illustrating an effective value of the output voltage of the power supply apparatus according to the second embodiment of the present invention.

The controller 235b can control the inverter 225b, while controlling the output voltage of the fuel cell power supply apparatus 211b (the period from the time t1 to t2 in FIG. 6), to output the voltage that has an effective value of less than the threshold value A1 as illustrated in FIG. 6. Alternatively, the controller 235b may also control the inverter 225b to output a voltage having an effective value same as that of the standard voltage, once the effective value of the output voltage falls below the threshold value A1.

After the effective value of the voltage output from the solar power supply apparatus 211a becomes equal to or greater than the threshold value B1 (at or after the time t2 in FIG. 6), the controller 235a can control the inverter 225a to maintain the effective value of the output voltage equal to or greater than threshold value B1 as illustrated in FIG. 6. Alternatively, the controller 235a may also control the inverter 225a to output a voltage having an effective value same as that of the standard voltage, once the effective value of the output voltage becomes equal to or greater than the threshold value B1.

As describe above, in the present embodiment, when the power supplied from the solar power supply apparatus 211a becomes less than the required power, the controller 235a changes the voltage output from the solar power supply apparatus 211a to have an effective value less than the threshold value A1. This allows the controller 235b to identify that the power supply from the solar power supply apparatus 211a is in shortage, to thereby start controlling the output voltage from the fuel cell power supply apparatus 211b. Meanwhile, when the power supplied from the solar power supply apparatus 211a becomes equal to or greater than the required power, the controller 235b changes the voltage output from the fuel cell power supply apparatus 211b to have an effective value equal to or greater than the threshold value B1. This allows the controller 235a to identify that power supply from the solar power supply apparatus 211a is sufficient, to thereby start controlling the output voltage from the solar power supply apparatus 211a. Each of the power supply apparatuses 211a and 211b of the second embodiment changes the output voltage in order to give instructions of switching the controlling scheme between power supply apparatuses. The power supply apparatuses 211a and 211b, in no need to include communication interfaces unlike the first embodiment, can reduce the circuit size. Furthermore, the controllers 235a and 235b would not be bothered by the communication errors caused by communication congestion or electro-magnetic compatibility (EMC), so that there would be no failure in giving instructions of switching the controlling scheme between the power supply apparatuses.

(Third Embodiment)

While the second embodiment achieves switching of the controlling scheme between the power supply apparatuses 211 through changing the effective values of the output voltages of the power supply apparatuses 211, a third embodiment achieves the same through changing the frequencies of the output voltages of the power supply apparatuses. The elements constituting a power supply system 301 according to the third embodiment are identical to those of the power supply system 201 of the second embodiment. The first power supply apparatus (solar power conditioner) is denoted as 311a and the second power supply apparatus (fuel cell power conditioner) is denoted as 311b. The first power supply apparatus 311a and the second power supply apparatus 311b are connected in parallel to a load 315, similarly to the second embodiment, and a first power source (solar cell) 317 is connected to the first power supply apparatus 311a and a second power source (fuel cell) 319 is connected to the second power supply apparatus 311b. The first and the second power supply apparatuses 311a and 311b may be connected to a grid 320.

The elements constituting a power supply apparatus 311 (311a and 311b) according the third embodiment are same as those of the power supply apparatus 211 of the second embodiment. The power supply apparatus 311 includes a power terminal 321, a convertor 323, an inverter 325, a load terminal 327, a grid terminal 328, current sensors 329-1 and 329-2, voltage sensors 331-1, 331-2, and 331-3, an independent output switch 332, a parallel switch 333, and a controller 335. The functions of the power terminal 321, the converter 323, the inverter 325, the load terminal 327, the grid terminal 328, the current sensors 329-1 and 329-2, the voltage sensors 331-1, 331-2, and 331-3, the independent output switch 332, and the parallel switch 333 are identical to those of the power terminal 221, the converter 223, the inverter 225, the load terminal 227, the grid terminal 228, the current sensors 229-1 and 229-2, the voltage sensors 231-1, 231-2, and 231-3, the independent output switch 232, and the parallel switch 233 of the second embodiment. The explanations thereof are thus omitted.

Similarly to the second embodiment, elements with reference numerals each having "a" attached to its end represent the function blocks for the solar power supply apparatus 311a, and elements with reference numerals each having "b" attached to its end represent the function blocks for the fuel cell power supply apparatus 311b.

Figure 7:
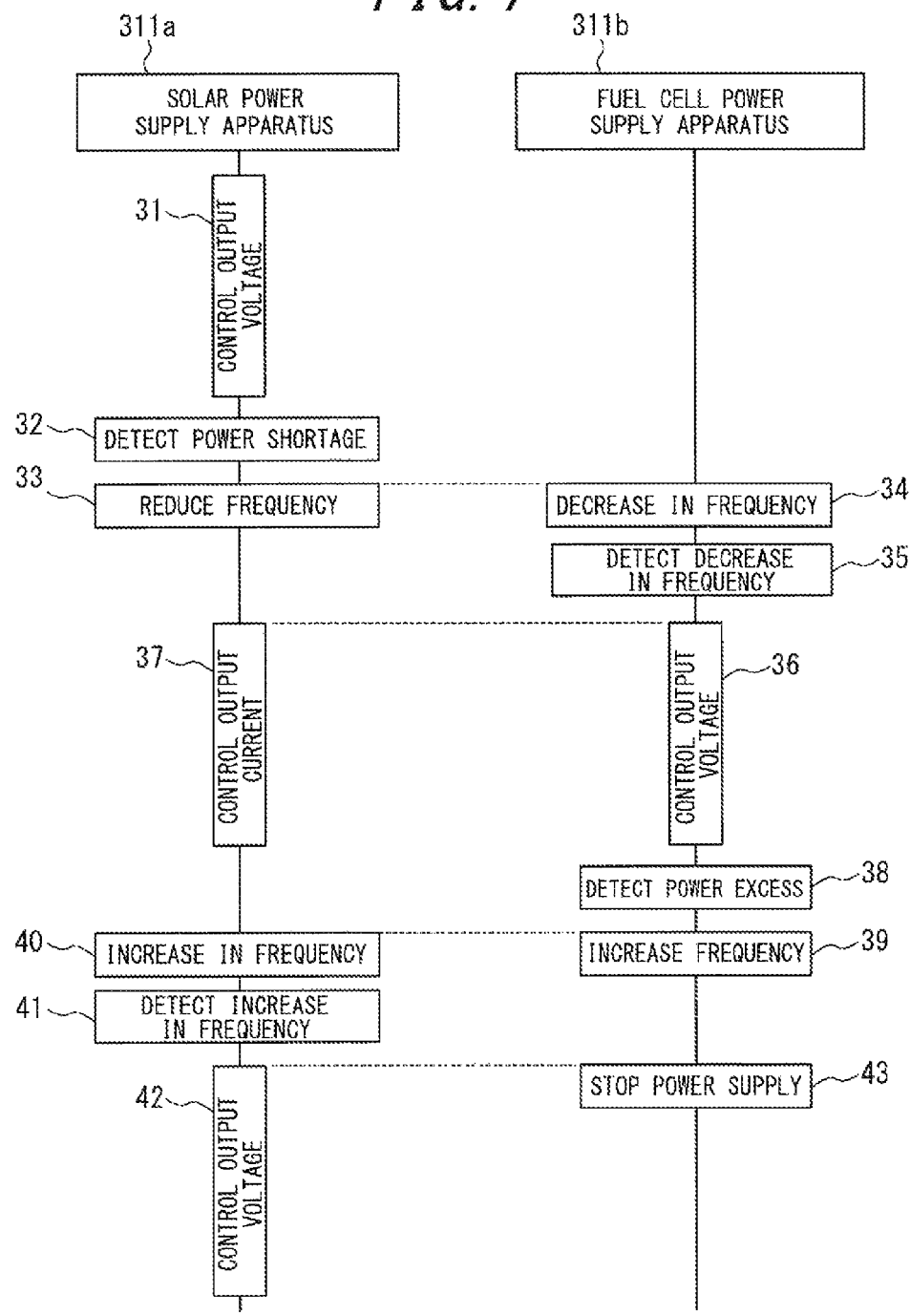
FIG. 7 is a sequence diagram illustrating processes of two power supply apparatuses according to a third embodiment of the present invention.

The following describes how to control the power supply system 301 to supply power to the load 315 with reference to FIG. 7. FIG. 7 is a sequence diagram illustrating procedures of the two power supply apparatuses according to the third embodiment of the present invention. Steps 31, 32, 36, 37, 38, 42, and 43 in FIG. 7 are performed similarly to Steps 11, 12, 16, 17, 18, 22, and 23 in FIG. 5, respectively. The explanations of thereof are thus omitted.

First, assumed is a case where the power supplied from the solar power supply apparatus 311a becomes less than the required power, which causes a power shortage at the load 315 (Step 32 of FIG. 7). In this case, the controller 335a changes the voltage output from the solar power supply apparatus 311a such that the voltage satisfies a first frequency condition, in order to instruct the controller 335b to start controlling the voltage output from the fuel cell power supply apparatus 311b. The first frequency condition may be defined, for example, as that the frequency of the voltage output from the solar power supply apparatus 311a becomes less than a threshold value C1 (threshold value C1<frequency of the standard voltage (assumed as 50 Hz here)) or as that the frequency of the same is equal to or greater than a threshold value C2 (threshold value C2>frequency of the standard voltage). Alternatively, the controller 335a may determine that the effective value stays, for a certain period of time, in a value less than the threshold value C1 or stays in a value equal to or greater than the threshold value C2 before that the first frequency condition is satisfied, because turning on/off the switch of the load 315 may cause the frequency to temporarily fall below the threshold value C1 or become equal to or greater than the threshold value C2. Hereinafter, in the present embodiment, the first frequency condition is regarded as being satisfied when the frequency of the voltage output from the solar power supply apparatus 311a becomes less than the threshold value C1. The controller 335a controls the inverter 325a to thereby reduce the frequency of the output voltage until the frequency becomes less than the threshold value C1 (Step 33 of FIG. 7 and time t3 of FIG. 8). Here, the threshold value C1 may be set, for example, to be in a allowable range of the frequency for the AC voltage of the grid 320, which allows the frequency of the output voltage to be reduced without adversely affecting the load 315. The threshold value C1 may be also set to be in a range that does not cause flicker influences to the load 315. Furthermore, the controller 335a may change the frequency of the voltage output from the solar power supply apparatus 311a near the zero-crossing point of such a voltage, in order to prevent the occurrence of harmonics.

As the frequency of the output voltage of the inverter 325a of the solar power supply apparatus 311a decreases, the frequency of the output voltage of the fuel cell power supply apparatus 311b connected in parallel with the solar power supply apparatus 311a also decreases (Step 34 of FIG. 7). The controller 335b accordingly detects, based on the measurement from the voltage sensor 331b-3, that the frequency of the voltage at the voltage sensor 331b-3 is less than the threshold value C1 (Step 35 of FIG. 7). The controller 335b then identifies that the power supplied from the solar power supply apparatus 311a has become less than the required power.

Upon determining that the frequency of the voltage at the voltage sensor 331b-3 has become less than the threshold value C1, the controller 335b starts controlling the voltage output from the fuel cell power supply apparatus 311b (Step 36 of FIG. 7). Meanwhile, upon determining that the frequency of the voltage output from the inverter 325a has decreased to the frequency less than the threshold value C1, the controller 335a starts controlling the output current from the solar power supply apparatus 311a (Step 37 of FIG. 7).

Next, assumed is a case where the power supplied from the solar power supply apparatus 311a becomes equal to or greater than the required power; that is, the power supply is excessive (Step 38 of FIG. 7). The controller 335b changes the voltage output from the fuel cell power supply apparatus 311b such that the voltage satisfies a second frequency condition. The second frequency condition may be defined, for example, as that the frequency of the voltage output from the fuel cell power supply apparatus 311b becomes equal to or greater than a threshold value D1 (threshold value D1>frequency of the standard voltage) or as that the frequency of the same becomes less than a threshold value D2 (threshold value D2<frequency of the standard voltage). Alternatively, the controller 335b may determine that the frequency stays, for a certain period of time, equal to or greater than the threshold value D1 or stays less than the threshold value D2 before determining that the second frequency condition is satisfied, because turning on/off the switch of the load 315 may temporarily change the frequency to become equal to or greater than the threshold value D1 or to fall below the threshold value D2. Hereinafter, in the present embodiment, the second frequency condition is regarded as being satisfied when the frequency of the voltage output from the fuel cell power supply apparatus 311b is equal to or greater than the threshold value D1. The controller 335b thus increases the frequency of the output voltage, by controlling the inverter 325b, until the frequency becomes equal to or greater than the threshold value D1 (Step 39 of FIG. 7 and time t4 of FIG. 7). This increasing may be done without adversely affecting the load 315 when, for example, setting the threshold value D1 within an allowable range of the frequency for the AC voltage of the grid 320. The threshold value D1 may be also set in a range that does not cause flicker influences to the load 315. Furthermore, to prevent the occurrence of harmonics, the controller 335b may change the voltage output from the fuel cell power supply apparatus 311b near the zero-crossing point of such a voltage.

As the frequency of the output voltage of the inverter 325b of the fuel cell power supply apparatus 311b increases, the frequency of the output voltage of the solar power supply apparatus 311a connected in parallel with the fuel cell power supply apparatus 311b also increases (Step 40 of FIG. 7). The controller 335a accordingly detects, based on the measurement from the voltage sensor 331a-3, the frequency of the voltage at the voltage sensor 331a-3 has become equal to or greater than the threshold value D1 (Step 41 of FIG. 7). The controller 335a then identifies that the power supplied from the solar power supply apparatus 311a has become equal to or greater than the required level.

Upon determining that the frequency of the voltage at the voltage sensor 331a-3 has become equal to or greater than the threshold value D1, the controller 335a stops controlling the output current of the solar power supply apparatus 311a and starts controlling the output voltage (Step 42 of FIG. 7). Meanwhile, upon determining that the frequency of the voltage output from the inverter 325b has increased to the frequency equal to or greater than the threshold value D1, the controller 335b stops the fuel cell power supply apparatus 311b from supplying power (Step 43 of FIG. 7).

Figure 8:
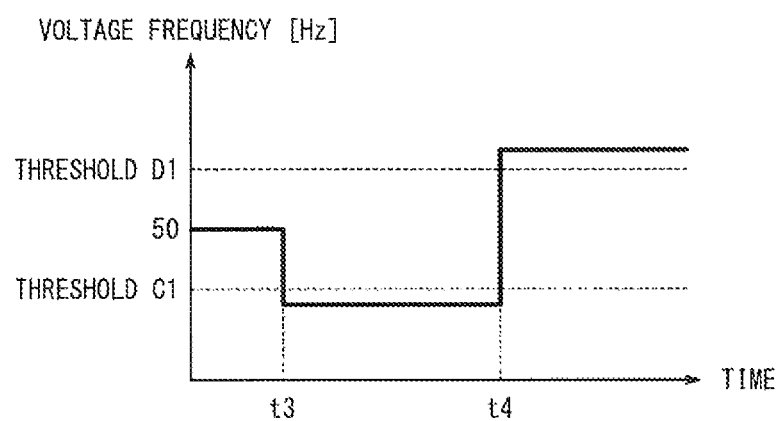
FIG. 8 is a graph illustrating a frequency of the output voltage of the power supply apparatus according to the third embodiment of the present invention.

The controller 335b may control the inverter 325b, while controlling the output voltage of the fuel cell power supply apparatus 311b (the period from the time t3 to t4 in FIG. 8), to output the voltage that has a frequency less than the threshold value C1 as illustrated in FIG. 8. Alternatively, the controller 335b may also control the inverter 325b to output the voltage having a frequency same as that of the standard voltage, once the frequency of the output voltage falls below the threshold value C1.

After the frequency of the voltage output from the solar power supply apparatus 311a becomes equal to or greater than the threshold value D1 (at or after the time t4 in FIG. 8), the controller 335a may control the inverter 325a to maintain the frequency equal to or greater than threshold value D1 as illustrated in FIG. 8. Alternatively, the controller 335a may also control the inverter 325a to output a voltage having a frequency same as that of the standard voltage, once the frequency of the output voltage becomes equal to or greater than the threshold value D1.

As describe above, in the present embodiment, when the power supplied from the solar power supply apparatus 311a becomes less than the required power, the controller 335a changes the voltage output from the solar power supply apparatus 311a to have a frequency less than the threshold value C1. This allows the controller 335b to identify that the power supply from the solar power supply apparatus 311a is in shortage, to thereby control the output voltage from the fuel cell power supply apparatus 311b. Meanwhile, when the power supplied from the solar power supply apparatus 311a becomes equal to or greater than the required power, the controller 335b changes the voltage output from the fuel cell power supply apparatus 311b to have a frequency equal to or greater than the threshold value D1. This allows the controller 335a to identify that power supply from the solar power supply apparatus 311a is sufficient, to thereby start controlling the output voltage from the solar power supply apparatus 311a. Each of the power supply apparatuses 311a and 311b of the third embodiment changes the output voltage in order to give instructions of switching the controlling scheme between power supply apparatuses. The power supply apparatuses 311a and 311b, in no need to include communication interfaces unlike the first embodiment, may reduce the circuit size. Furthermore, the controllers 335a and 335b would not be bothered by the communication errors caused by communication congestion or electro-magnetic compatibility (EMC), so that there would be no failure in giving instructions of switching the controlling scheme between the power supply apparatuses.

Although the invention has been described based on the drawings and embodiments, it should be understood that various alternations and modifications of the invention will be apparent to those skilled in the art. It should therefore be noted that those alternations and modifications are included in the scope of this invention.

For example, each member, each device, and functions included in each Step may be rearranged as long as they are logically consistent. Multiple devices or Steps may be combined as one or a single device or Step may be divided into a number of devices or Steps.

In the above description, the embodiments have been illustrated by regarding the first power supply apparatus as a solar power supply apparatus and the second power supply apparatus as a fuel cell power conditioner. However, the present invention is not limited thereto. For example, the first power supply apparatus may be implemented as a hydroelectric power supply apparatus and the second power supply apparatus may be implemented as a rechargeable battery power conditioner, or the first power supply apparatus may be implemented as a rechargeable battery power supply apparatus and the second power supply apparatus may be implemented as a fuel cell power conditioner. When the power supply apparatus is a rechargeable battery power conditioner, the converter and inverter may be made as a bi-directional converter and a bi-directional inverter, respectively. The bi-directional inverter may convert the AC voltage from the grid or from the other power supply apparatus connected in parallel into a DC voltage to supply the converted DC voltage to the bi-directional converter. The bi-directional converter may increase or reduce the DC voltage from the bi-directional inverter to supply the resulting voltage to the rechargeable battery being a power source of the rechargeable battery power conditioner. This enables the rechargeable battery to be charged.

In the above description, the embodiments have been illustrated by using the power supply system having two power supply apparatuses connected in parallel. However, the present invention is not limited thereto. For example, the first power supply apparatus may be implemented as the one including two power supply apparatuses connected in parallel, or the power supply system may include three power supply apparatuses in total.

In the above description, the embodiments have been illustrated as achieving the switching of the controlling scheme (current control, voltage control, and power supply stop) between the power supply apparatuses through transmission of the synchronization signals, changing the effective value of the output voltage of the power conditioner, or changing the frequency of the output voltage of the same. However, the present invention is not limited thereto. For example, the switching of the controlling scheme may be achieved by combining the transmission of the synchronization signals, changing of the effective value, and changing of the frequency. The controller of the power supply apparatus performs the switching of the controlling scheme first through the transmission of the synchronization signals, and when the signal transmission fails due to communication errors, the controller may then change the output voltage to perform the switching. This allows the system to even more reliably perform the switching of the controlling scheme.

In the above description, the embodiments have been illustrated by using the controller built inside the first power supply apparatus for controlling the output power and the output current of the first power conditioner. However, the invention is not limited to thereto. For example, a home energy management system (HEMS) provided outside the first power supply apparatus may determine that the power supplied from the first power supply apparatus to the load is equal to or greater than the power required by the load, and instruct the first power supply apparatus to control the output voltage thereof. Alternatively, the HEMS may determine that the supplied power is less than the required power, and instruct the first power supply apparatus to control the output current thereof. In the communications between the first power supply apparatus and the HEMS, the signals exchanged therebetween are desired to be in a format compliant with communications protocols specified by a standards group, such as ECHONET Lite, ZigBee (Registered Trademark), and KNX.

REFERENCE SIGNS LIST 101 power supply system
111 power conditioner
111a, 211a, 311a first power supply apparatus (solar power conditioner)
111b, 211b, 311b second power supply apparatus (fuel cell power conditioner)
115 load
117 first power source (solar cell)
119 second power source (fuel cell)
120 grid
121 power source terminal
123 converter
125 inverter
127 load terminal
128 grid terminal
129-1, 129-2 current sensor
131-1, 131-2, 131-3 voltage sensor
132 independent output switch
133 parallel switch
134 communication interface
135 controller

The invention claimed is:
1. A power supply system, comprising:
a first power supply apparatus configured to operate independently; and
a second power supply apparatus configured to supply power to a load to which AC power output from the first power supply apparatus is supplied, the first power supply apparatus and the second power supply apparatus being each connected to the load in parallel, wherein the first power supply apparatus includes a first controller configured to control an output voltage of the first power supply apparatus when power supply supplied from the first power supply apparatus to the load is equal to or greater than power requirement required by the load, and to control an output current of the first power supply apparatus when the power supply is less than the power requirement, the second power supply apparatus includes a second controller configured to stop the second power supply apparatus from supplying power when the power supply is equal to or greater than the power requirement, and to control an output voltage of the second power supply apparatus when the power supply is less than the power requirement, wherein the power supply system including one of:
the first controller is configured to change, when the power supply becomes less than the power requirement, the voltage output from the first power supply apparatus such that the voltage satisfies a first effective-value condition, and the second controller is configured to change, when the power supply becomes equal to or greater than the power requirement, the voltage output from the second power supply apparatus such that the voltage satisfies a second effective-value condition; and
the first controller is configured to change, when the power supply becomes less than the power requirement, the voltage output from the first power supply apparatus such that the frequency satisfies a first frequency condition, and the second controller is configured to change, when the power supply becomes equal to or greater than the power requirement, the voltage output from the second power supply apparatus such that the frequency satisfies a second frequency condition.

2. The power supply system according to claim 1, wherein the first power supply apparatus further includes an inverter configured to convert DC power into AC power and to supply the AC power to the load, and
the first controller is configured to determine that the power supply is less than the power requirement based on a voltage input to the inverter being less than a predetermined voltage.

3. The power supply system according to claim 1, wherein the first power supply apparatus further includes a first communication interface for sending and receiving a signal to and from the second power supply apparatus,
the second power supply apparatus further includes a second communication interface for sending and receiving a signal to and from the first power supply apparatus, the second communication interface connecting with the first communication interface,
the first controller is configured to send a synchronization signal, which instructs to start controlling the output voltage, to the second power supply apparatus via the first communication interface when the power supply becomes less than the power requirement, and
the second controller is configured to send a synchronization signal, which instructs to start controlling the output voltage, to the first power supply apparatus via the second communication interface when the power supply becomes equal to or greater than the power requirement.

4. The power supply system according to claim 1, wherein the first power supply apparatus is for outputting electric power from natural energy, and
the first controller is configured input a maximum output operation voltage obtained by using maximum power point tracking (MPPT) to the inverter when the first power supply apparatus is controlling the output current.

5. A power supply apparatus configured to operate independently, the power supply apparatus being connected to a load in parallel with another power supply apparatus, the another power supply apparatus being configured to supply power to the load to which power is supplied from the power supply apparatus, wherein
the power supply apparatus includes a controller configured to:
control an output voltage of the power supply apparatus when power supply supplied from the power supply apparatus to the load is equal to or greater than power requirement required by the load;
control an output current of the power supply apparatus and instruct the another power supply apparatus to control an output voltage of the another power supply apparatus when the supplied power is less than the power requirement, and
the power supply apparatus including one of:
the controller is configured to change, when the power supply becomes less than the power requirement, the voltage output from the power supply apparatus such that the voltage satisfies a first effective-value condition, and
the controller is configured to change, when the power supply becomes less than the power requirement, the voltage output from the power supply apparatus such that the frequency satisfies a first frequency condition.

6. A method for controlling a power supply system that includes: a first power supply apparatus configured to operate independently; and a second power supply apparatus configured to supply power to a load to which AC power output is supplied from the first power supply apparatus, the first power supply apparatus and the second power supply apparatus being each connected to the load in parallel, the method comprising the steps of:
causing the first power supply apparatus
to control an output voltage of the first power supply apparatus when power supplied from the first power supply apparatus to the load is equal to or greater than power required by the load, and
to control an output current of the first power supply apparatus when power supply supplied from the first power supply apparatus is less than power requirement required by the load; and
causing the second power supply apparatus
to stop the second power supply apparatus from supplying power when the power supply is equal to or greater than the power requirement, and
to control an output voltage of the second power supply apparatus when the power supply is less than the power requirement,
the method further including one of:
causing the first power supply apparatus to change, when the power supply becomes less than the power requirement, the voltage output from the first power supply apparatus such that the voltage satisfies a first effective-value condition, and causing the second power supply apparatus to change, when the power supply becomes equal to or greater than the power requirement, the voltage output from the second power supply apparatus such that the voltage satisfies a second effective-value condition; and causing the first power supply apparatus to change, when the power supply becomes less than the power requirement, the voltage output from the first power supply apparatus such that the frequency satisfies a first frequency condition, and causing the second power supply apparatus to change, when the power supply becomes equal to or greater than the power requirement, the voltage output from the second power supply apparatus such that the frequency satisfies a second frequency condition.

\* \* \* \* \*